United States Patent [19]

Pivonka et al.

[11] Patent Number: 5,786,218
[45] Date of Patent: Jul. 28, 1998

[54] METHOD FOR MONITORING SOLID PHASE REACTIONS

[75] Inventors: Donald Eugene Pivonka; Keith Russell, both of Newark, Del.

[73] Assignee: Zeneca Limited, London, United Kingdom

[21] Appl. No.: 689,942

[22] Filed: Aug. 16, 1996

[51] Int. Cl.$^6$ ...................................................... G01N 33/00
[52] U.S. Cl. ............................... 436/34; 436/56; 436/86; 436/87; 436/88; 436/90; 436/183
[58] Field of Search ........................... 436/34, 56, 86–90, 436/164, 183; 530/335, 337

[56] References Cited

U.S. PATENT DOCUMENTS 5,021,337  6/1991  Wong et al. ................................ 435/29

OTHER PUBLICATIONS

G.W. Keulks et al. *Int. Congr. Catal. 8th* 1985, 3, 289–297.
Aldrich Chemical Company Catalog 1988 pp. 1554–1562.
D.W. Schiering *Appl. Spectrosc.* 1988, 42, 903–906.
O. Faurskov Nielson et al. *Spec. Publ.—R. Soc. Chem.* 1991, 94, 39–40.
M.A. Druy et al. *Proc. SPIE—Int. Soc. Opt. Eng.* 1991, 1437, 66–74.
B.D. Larsen et al. *J. Am. Chem. Soc.* 1993, 115, 6247–6253.
K. Russell et al. *J. Am. Chem. Soc.* 1996, 118, 7941–7945.
M. A. Gallop et al., "Applications of combinatorial technologies to drug discovery. 1. Background and peptide combinatorial libraries", *Journal of Medicinal Chemistry*, (1994) vol. 37, No. 9. 1233–1251.
E. M. Gordon et al., "Applications of combinatorial technologies to drug discovery. 2. Combinatorial organic synthesis, library screening strategies, and future directions", *Journal of Medicinal Chemistry*, (1994) vol. 37, No. 10, 1385–1401.
J. C. Hendrix et al., "A novel solvent system for solid–phase synthesis of protected peptides: The disaggregation of resin–bound antiparallel β–sheet", *Journal of Organic Chemistry*, (1990), 55, 4517–4518.
J. M. Frechet et al., "Solid phase synthesis of oligosaccharides, I. Preparation of the solid support. Poly [p–(1–propen–3–ol–1–yl)styrene]", *Journal of the American Chemical Society*, (1971) 93:2, 492–496.

C. Chen et al., "Analogous" organic synthesis of small–compound libraries: Validation of combinatorial chemistry in small–molecule synthesis, *Journal of the American Chemical Society*, (1994), 116, 2661–2662.
B. Yan et al., "Infrared spectrum of a single resin bead for real–time monitoring of solid–phase reactions", *Journal of Organic Chemistry*, (1995), 60, 5736–5738.
J. I. Crowley et al., "Undirectional dieckmann cyclizations on a solid phase and in solution", *Journal of Organic Chemistry*, (1980), 45, 3215–3227.
J. Y. Wong, "Polymeric carbondiimide. I. Preparation", *Organic Synthesis*, vol. 56, pp. 95–99.
J.W. Brauner et al., "A comparison of differential scanning calorimetric and Fourier transform infrared spectroscopic determination of mixing behavior in binary phospholipid systems", *Biochimica et Biophysical Acta 861*, (1986) 16–24.
J. R. Hauske et al., "A solid phase CBZ chloride equivalent—A new matrix specific linker", *Tetrahedron Letters*, (1995), vol. 36, No. 10, 1589–1592.
Yuan–Peng Zhang et al., "FTIR spectroscopic studies of the conformation and amide hydrogen exchange of a peptide model of the hydrophobic transmembrane α–helices of membrane proteins", *Biochemistry*, (1992), 31, 11572–11578.
G. C. Look et al., "Methods for combinatorial organic synthesis: The use of fast $^{13}$C NMR analysis for gel phase reaction monitoring", *Journal of the American Chemical Society*, (1994), 59, 7588–7590.
P. A. Martoglio et al., "Direct monitoring of combinatorial chemistry reactions by infrared microspectroscopy", received by inventor Pivonka from Nicolet Instrument Corporation's sales representative, Nov. 14, 1995, at the Eastern Analytical Symposium, Summerset, New Jersey.

*Primary Examiner*—Arlen Soderquist
*Attorney, Agent, or Firm*—Paul R. Darkes

[57] ABSTRACT

A novel method for monitoring the success or the yield of chemical reactions involving a reactant bound to a solid phase support, or to forecast the success of such reactions, or to quantify the number of deuterium containing groups present in a solid-phase bound sample, using infrared spectroscopy and deuterium-carbon absorbances, along with novel compounds and intermediates useful for carring out the method.

8 Claims, 5 Drawing Sheets

5,786,218

METHOD FOR MONITORING SOLID PHASE REACTIONS

This invention concerns a novel method for monitoring solid-phase chemical reactions using infrared spectroscopy. In particular, the invention relates to the use of infrared spectroscopy and deuterium-carbon absorbances: to monitor the success or the yield for a chemical reaction involving a reactant that is bound to a solid phase support, or to forecast the success of a reaction involving a solid-phase bound reagent, or to quantify the number of deuterium containing groups present in a solid-phase bound sample.

Combinatorial chemistry has been defined as, "the systematic and repetitive, covalent connection of a set of different 'building blocks' of varying structures to each other to yield a large array of diverse molecular entities." Gallop M. A., et al. *Journal of Medicinal Chemistry*, 1994, 37, 9, 1233–1251 at 1233. Because combinatorial chemistry makes it possible to quickly generate large numbers of chemically diverse molecules, including peptides, peptoids, oligonucleosides and small molecules, it is the subject of particular interest in the pharmaceutical and agrochemical fields, where the availability of large numbers of compounds for screening is desired. One specific application of combinatorial chemistry involves performing chemical reactions with reagents which are bound to a solid-phase support. This solid-phase approach is advantageous because it results in reaction products which are easily purified and easily handled. One draw back to the solid-phase approach, however, is that the products can not be easily characterized using standard techniques, such as nuclear magnetic resonance (NMR) spectroscopy, mass spectrometry, combustion analysis, and high performance liquid chromatography (HPLC). Since these techniques can not consistently be utilized with reaction products that are bound to a solid phase, it can be difficult to determine whether an attempted solid-phase reaction has been successfully accomplished. It can also be difficult to determine the quantitative yield for solid-phase reactions. Therefore, there is a need in the field of synthetic chemistry for methods to facilitate the analysis of reaction products which are bound to solid phase supports.

Infrared spectroscopy has been used for many years to assist in the identification of non-support-bound chemical compounds. Despite the wide-spread use of infrared spectroscopy within the field of chemistry, and despite the existing need for methods to facilitate the analysis of solid phase reaction products, infrared spectroscopy has not been widely used to analyze solid-phase reaction products. The presence and size of solid phase support materials introduces a level of complexity to sample preparation, data collection, data manipulation and spectral selectivity, which are not encountered in the absence of a solid phase support. Although these difficulties have historically limited the application of infrared spectroscopy for analysis of solid-phase bound samples, infrared spectroscopy has been used to characterize: the aggregation of solid-phase bound peptides (Hendrix, J. C. et al., *Journal of Organic Chemistry*, 1990, 55, 4517–4518); solid-phase bound oligosaccharides (Frechet, J. M., *Journal of the American Chemical Society*, 1971, 93:2, 492–496); and other solid-phase bound samples (Chen, C., *Journal of the American Chemical Society*, 1994, 116, 2661–2662; Yan B., *Journal of Organic Chemistry*, 1995, 60, 5736–5738; and Crowley, J. I., *Journal of Organic Chemistry*, 1980, 45, 3215–3227).

Of the difficulties encountered during the infrared analysis of solid-phase bound samples, selectivity (i.e. the ability to analyze weak absorbances in the presence of strong overlapping absorbances from the solid-phase support itself, or from similar functional groups in the sample, or even from identical functional groups which absorb differently due to differing chemical geometries within the compound) is the primary limitation. Because of limited selectivity, it may not be possible, or practical, to monitor reactions using the infrared absorbing groups present in a desired product. One possible solution is to introduce additional functional group "tags," with unique infrared absorbances, into the solid-phase sample to facilitate infrared analysis. These tags, however, need to be removed following the analysis in order to obtain the desired products. As a result of the need to remove the tags, this is not a highly useful method for monitoring solid-phase reactions.

It has been discovered that solid-phase bound products that include deuterium can be analyzed using infrared spectroscopy with a very high degree of selectivity. Although infrared spectroscopy has been used to analyze deuterium in non-solid-phase bound materials, it has not been utilized as a tool to assist in the analysis of solid-phase bound samples.

Deuterated reagents have a number of unique properties which make them exceptionally well suited for use in monitoring solid-phase reactions. Replacement of hydrogen with deuterium does not dramatically alter the electronic or steric properties of a compound, hence, corresponding deuterium containing reagents react at rates which are similar to the rates of corresponding hydro-compounds. Because of these unique features, and because the carbon deuterium stretching absorbance falls in an uninterfered region of the infrared spectrum, infrared spectroscopy used in conjunction with deuterium labeled reagents, produces a highly selective analytical tool for the qualitative and quantitative analysis of solid-phase bound samples. This tool is useful in the emerging field of combinatorial chemistry, where there is a need to monitor reactions involving solid-phase bound reagents, and to analyze solid-phase bound products.

The present invention involves the novel use of infrared spectroscopy, and deuterium-carbon absorbances, to determine the success of solid-phase chemical reactions. According to the invention, therefore, there is provided a method for determining the success of a solid-phase reaction comprising the steps of: a) reacting a compound which is bound to a solid-phase support with a deuterium containing reagent; b) measuring the infrared spectrum of the resulting product; and c) determining if deuterium has been incorporated in said product by determining the presence or absence of carbon-deuterium absorbances in said infrared spectrum. This method may be carried out using any of the preferred reagents, supports, sample preparation techniques, or data collection techniques discussed herein.

The invention also includes a method for forecasting the success of a solid phase chemical reaction involving a non-deuterated reagent, comprising the steps of: a) reacting a compound which is bound to a solid-phase support, with a deuterium containing reagent that corresponds to said non-deuterated reagent; b) measuring the infrared spectrum of the resulting product; c) determining if deuterium has been incorporated in said product by determining the presence or absence of carbon-deuterium absorbances in said infrared spectrum; and d) forecasting the success of a solid phase chemical reaction involving a corresponding non-deuterated reagent. This method may be carried out using any of the preferred reagents, supports, sample preparation techniques, or data collection techniques discussed herein.

Along with determining whether a solid-phase chemical reaction has been successful, the present invention also involves the novel use of infrared spectroscopy, and deuterium-carbon absorbances, to determine the yield of a chemical reactions involving a solid-phase bound reagent. Accordingly, as another preferred embodiment of the invention, there is provided a method for determining the yield of a chemical reaction involving a solidphase bound deuterium containing sample comprising the steps of: a) measuring the infrared spectrum of the solid-phase bound reaction product; b) comparing the spectral data to a calibration data set that correlates carbon-deuterium absorbance with the percent deuterium present; and c) determining the yield of the chemical reaction from that calibration. The invention also includes a method for determining the yield of a chemical reaction involving a solid-phase bound reagent comprising the steps of: a) reacting a compound which is bound to a solid-phase support with a deuterium containing reagent; b) measuring the infrared spectrum of the resulting product; c) comparing the spectral data to a calibration data set that correlates carbon-deuterium absorbance with the percent deuterium present; and d) determining the yield for the solid-phase reaction performed in step a). This method may be carried out using any of the preferred reagents, supports, sample preparation techniques, or data collection techniques discussed herein.

The present invention also involves the novel use of infrared spectroscopy, and deuterium-carbon absorbances, to determine the number of deuterium containing protecting groups in a solid-phase bound sample. Accordingly, as another preferred embodiment of the invention, there is provided a method for determining the number of deuterium containing protecting groups in a solid-phase bound sample comprising the steps of: a) measuring the infrared spectrum of a solid-phase bound sample; b) determining the number of deuterium containing protecting groups by comparing the spectral data to a calibration data set that correlates carbon-deuterium absorbance with the number of deuterium containing protecting groups present. The invention also includes a method for determining the number of deuterium containing protecting groups in a solid-phase bound sample comprising the steps of: a) reacting a compound which is bound to a solid-phase support, with a reagent that contains a deuterium containing protecting group; b) measuring the infrared spectrum of the resulting product; and c) determining the number of deuterium containing protecting groups present by comparing the spectral data to a calibration data set that correlates carbon-deuterium absorbance with the number of deuterium containing protecting groups present. This method may be carried out using any of the preferred reagents, supports, sample preparation techniques, or data collection techniques discussed herein. Solid-phase bound peptide libraries and solid-phase bound compound libraries which include amino acid residues in the library compounds, are widely prepared and used within the fields of chemistry and biochemistry. During the preparation of these libraries, chemists often need to determine if a chemical reaction, such as for example the addition of an amino acid residue to the solid-phase bound sample, has successfully been accomplished. The invention disclosed herein allows this determination to be made using infrared spectroscopy, when the amino acid being added to the solid-phase bound sample contains deuterium, or when the amino acid being added to the solid-phase bound sample includes a deuterium containing protecting group. Therefore, when used in conjunction with the methods disclosed herein, deuterium containing amino acids and amino acids protected with deuterium containing protecting groups are highly useful tools for synthetic chemists and biochemists.

Accordingly, the present invention includes a compound which is a N-[($^2H_9$)-tert-butoxycarbonyl] protected, or N-($^2H_8$)-fluorenylmethoxycarbonyl) protected derivative of a natural or unnatural amino acid, which amino acid may be selected for example from: Alanine, Arginine, Asparagine, Aspartic acid, Cysteine, Glutamic acid, Glycine, Histidine, 5-Hydroxylysine, 4-Hydroxyproline, Isoleucine, Leucine, Lysine, Methionine, Phenylalanine, Proline, Serine, Threonine, Tryptophan, Tyrosine, Valine, Homoserine, 5-Hydroxylysine, α-Methylserine, Ornithine, Pipecolic acid, Sarcosine, and Thyroxine. These deuterium containing derivatives can be prepared using procedures and starting materials which are well known in the chemical arts, or using procedures similar to those described herein, and in particular, using a procedure similar to that described in Example 6.

Particular, α-N-[($^2H_9$)-tert-butoxycarbonyl] protected amino acids include: N-[($^2H_9$)-tert-butoxycarbonyl]-Alanine, N-[($^2H_9$)-tert-butoxycarbonyl]-Asparagine, N-[($^2H_9$)-tert-butoxycarbonyl]-Glutamine, N-[($^2H_9$)-tert-butoxycarbonyl]-Gycine, N-[($^2H_9$)-tert-butoxycarbonyl]-Boc-Isoleucine, N-[($^2H_9$)-tert-butoxycarbonyl]-Leucine, N-[($^2H_9$)-tert-butoxycarbonyl]-Methionine, N-[($^2H_9$)-tert-butoxycarbonyl]-Phenylalanine, N-[($^2H_9$)-tert-butoxycarbonyl]-Proline, N-[($^2H_9$)-tert-butoxycarbonyl]-Tryptophan, and N-[($^2H_9$)-tert-butoxycarbonyl]-Valine.

Particular α-N-[($^2H_8$)-fluorenylmethoxycarbonyl) protected amino acids include: N-[($^2H_8$)-fluorenylmethoxycarbonyl)-Alanine, N-[($^2H8$)-fluorenylmethoxycarbonyl)-Asparagine, N-[($^2H_8$)-fluorenyimethoxycarbonyl)-Glutamine, N-[($^2H_8$)-fluorenylmethoxycarbonyl)-Glycine, N-[($^2H_8$)-fluorenylmethoxycarbonyl)Isoleucine, N-[($^2H_8$)-fluorenylmethoxycarbonyl)-Leucine, N-[($^2N$-[($^2H_8$)-fluorenylmethoxycarbonyl)-Phentlalanine, N-[($^2H_8$)-fluorenylmethoxycarbonyl)-proline, N-[($^2H_8$)-fluorenylmethoxycarbonyl)-Tryptophan, and N-[($^2H_8$)-fluorenylmethoxycarbonyl)Valine. A more particular amino acid protected with a deuterium containing protecting group is α-N-(fluorenylmethoxycarbonyl)-ε-N-[($^2H_9$)-tert-butoxycarbonyl]-L-lysine.

A useful intermediate for the preparation of N-[($^2H_9$)-tert-butoxycarbonyl] protected compounds and amino acids is α-[($^2H_9$)-tert-butoxycarbonyloxyimino]benzyl cyanide.

A useful intermediate for the preparation of N-[($^2H_8$)-fluorenylmethoxycarbonyl) protected compounds and amino acids is [($^2H_8$)-fluoren-9-yl) methoxycarbonyl chloride. This intermediate can be prepared using methods which are well known in the art. The intermediate may also be prepared from 9-fluorenecarboxylic acid, by deuteration of the aromatic fluorene positions under standard conditions, such as for example by heating with a dilute solution of HCl in $D_2O$, or by treatment with $D_2O$ and a metal catalyst, followed by conversion to the activated carbonyl chloride using standard procedures.

The novel intermediates α-[($^2H_9$)-tert-butoxycarbonyloxyimino]benzyl cyanide and [($^2H_8$)-fluoren-9-yl)methoxycarbonyl chloride are also features of the invention.

The methods disclosed herein can also conveniently be performed using reagents that include other standard protecting groups in deuterio- or perdeuterio-form. The following table includes examples of traditional protecting groups used in the fields of synthetic chemistry and biochemistry, along with a list of deuterio- or perdeuterio intermediates useful for introducing the corresponding deuterio- or perdeuterio-protecting group into a sample. This table is not limiting, since other deuterium containing protecting groups, including deuterium containing protecting groups wherein all the hydrogens have not been replaced by deuterium, are also useful for carrying out the methods disclosed herein. In this table, the descriptor "perdeuterio" indicates that all hydrogens in the indicated compound have been replaced by deuterium.

| Protecting group | Intermediate |
| --- | --- |
| For Protecting Alcohols. | |
| methyl ether | perdeuteriodimethyl sulfate, or perdeuteriomethyl iodide |
| methoxymethyl ether | perdeuteriomethoxymethyl chloride |
| methylthiomethyl ether | perdeuteriomethylthiomethyl chloride, or perdeuteriomethyl-thiomethyl iodide |
| benzyloxymethyl ether | perdeuteriobenzyloxymethyl chloride |
| tert-butoxymethyl ether | perdeuterio(tert-butoxy)methyl chloride |
| trimethylsilyl ether | perdeuteriotrimethylsilyl chloride |
| tert-butyl-dimethylsilyl ether | perdeuterio(tert-butyl)dimethylsilyl chloride or perdeuterio-(tert-butyl)dimethylsilyl trifluoromethanesulfonate |
| 2-methoxyethoxymethyl ether | perdeuterio-2-methoxyethoxy-methyl chloride |
| 2-(trimethylsilyl)ethoxymethyl ether | perdeuterio-2-(trimethylsilyl)-ethoxymethyl chloride |
| tetrahydropyranyl ether | perdeuterio-dihydropyran |
| 1-ethoxyethyl ether | perdeuterio-1-ethoxyethylene |
| 2-trimethylsilylethyl ether | perdeuterio-2-trimethylsilylethyl chloride |
| tert-butyl ether | perdeuterio-isobutylene |
| allyl ether | perdeuterio-allyl chloride |
| 4-methoxyphenyl ether | perdeuterio-4-methoxyphenol |
| benzyl ether | perdeuteriobenzyl chloride |
| 4-methoxybenzyl ether | perdeuterio-4-methoxybenzyl chloride |
| triethylsilyl ether | perdeuteriotriethylsilyl chloride or perdeuterio-triethylsilyl trifluoro-methanesulfonate |
| triisopropylsilyl ether | perdeuterio-triisopropylsilyl chloride or perdeuterio-triisopropylsilyl tri-fluoromethanesulfonate |
| 2,2,2-trichloroethoxymethyl ether | perdeuterio-2,2,2-trichloroethoxy-methyl chloride |
| formate ester | perdeuterio-formic acid |
| acetate ester | perdeuterio acetic anhydride or perdeuterio acetyl chloride |
| chloroacetate ester | perdeuterio-chloroacetyl chloride |
| methoxy acetate ester | perdeuterio-methoxy acetyl chloride |
| pivaloate ester | perdeuterio-pivaloyl chloride |
| benzoate ester | perdeuterio benzoyl chloride |
| 2,2,2-trichloroethyl carbonate | perdeuterio-2,2,2-trichloroethoxy-carbonyl chloride |
| 9-fluorenylmethyl carbonate | perdeuterio-9-fluorenylmethoxy-carbonyl chloride |
| benzyl carbonate | perdeuterio-benzyloxycarbonyl chloride |
| For Protecting Acids | |
| methyl ester | perdeuterio methanol |
| 9-fluorenylmethyl ester | perdeuterio-9-hydroxymethylfluorene |
| methoxymethyl ester | perdeuterio-methoxymethyl chloride |
| methylthiomethyl ester | perdeuteriomethylthiomethyl chloride, |
| benzyloxymethyl ester | perdeuteriobenzyloxymethyl chloride |
| trimethylsilyl ester | perdeuteriotrimethylsilyl chloride |
| tert-butyl-dimethylsilyl ester | perdeuterio(tert-butyl)dimethylsilyl chloride |
| 2-methoxyethoxymethyl ester | perdeuterio-2-methoxyethoxy-methyl chloride |
| 2-(trimethylsilyl)ethoxymethyl ester | perdeuterio-2-(trimethylsilyl)ethoxy-methyl chloride |
| tetrahydropyranyl ester | perdeuterio-dihydropyran |
| 1-ethoxyethyl ether | perdeuterio-1-ethoxyethylene |
| tert-butyl ester | perdeuterio-isobutylene |
| benzyl ester | perdeuteriobenzyloxycarbonyl chloride |

-continued

| Protecting group | Intermediate |
| --- | --- |
| triethylsilyl ester | perdeuteriotriethylsilyl chloride |
| 2,2,2-trichloroethyl ester | perdeuterio-2,2,2-trichloroethanol |
| 2-(4-toluenesulfonyl)ethyl ester | perdeuterio-2-(4-toluenesulfonyl)-ethanol |
| phenol ester | per-deuterio-phenol |
| For Protecting Thiols | |
| benzyl thioether | perdeuterio-benzyl chloride |
| 4-methoxybenzyl thioether | perdeuterio-4-methoxybenzyl chloride |
| 9-fluorenylmethyl thioether | perdeuterio-9-fluorenylmethyl chloride |
| acetyl | perdeuterio-acetic anhydride |
| benzoyl | perdeuterio-benzoyl chloride |
| 2,2,2-trichloroethoxycarbonyl | perdeuterio-(2,2,2-trichloroethoxy)-carbonyl chloride |
| tert-butoxycarbonyl | perdeuterio-(tert-butoxy)carbonyl chloride |
| benzyloxycarbonyl | perdeuterio-benzyloxycarbonyl chloride |
| 4-methoxybenzyloxycarbonyl | perdeuterio-4-methoxybenzyloxy-carbonyl chloride |
| For Protecting Amines | |
| methyl carbamate | perdeuterio-methoxycarbonyl chloride |
| 9-fluorenylmethyl carbamate | perdeuterio-9-fluorenylmethoxy-carbonyl chloride |
| 2,2,2-trichloroethyl carbamate | perdeuterio-2,2,2-trichloroethoxy-carbonyl chloride |
| 2-trimethylsilylethyl carbamate | perdeuterio-2-trimethylsilylethyoxy-carbonyl chloride |
| tert-butyl carbamate | perdeuterio-(tert-butyl)anhydride |
| vinyl carbamate | perdeuterio-vinyloxycarbonyl chloride |
| allyl carbamate | perdeuterio-allyloxycarbonyl chloride |
| benzyl carbamate | perdeuterio-benzyloxycarbonyl chloride |
| acetamide | perdeuterio-acetic anhydride |
| formamide | perdeuterio-formic acid |
| phenylacetamide | perdeuterio-benzyl anhydride |
| benzamide | perdeuterio-phenylcarbonyl chloride |
| phthalimide | perdeuterio-phthalicanhydride |
| 2-trimethylsilylethoxymethyl chloride | perdeuterio-2-trimethylsilylethoxy-methyl |
| benzyl | benzyl chloride |
| 4-toluenesulfonyl | perdeuterio-4-toluenesulfonyl chloride |
| phenylsulfonyl | perdeuterio-phenylsulfonyl chloride |
| For Protecting Imidazoles, Pyrroles and Indoles | |
| 2,4,6-trimethylphenylsulfonyl | perdeuterio-2,4,6-trimethylphenyl-sulfonyl chloride |
| 4-methoxyphenylsulfonylsulfonyl | perdeuterio-4-methoxyphenylsulfonyl chloride |
| 4-toluenesulfonyl | perdeuterio-4-toluenesulfonyl chloride |
| 2,2,2-trichloroethoxycarbonyl | perdeuterio-2,2,2-trichloroethoxy-carbonyl chloride |
| 2-(trimethylsilyl)ethoxycarbonyl | perdeuterio-2-trimethylsilylethoxy-carbonyl chloride |
| tert-butoxycarbonyl | perdeuterio-tert-butoxycarbonyl chloride |
| vinyl | perdeuterio-vinyl acetate |
| tert-butyldimethylsilyl | perdeuterio-tert-butyldimethylsilyl chloride |
| triisopropylsilyl | perdeuterio-triisopropylsilyl chloride |
| 4-methoxybenzyl | perdeuterio-4-methoxybenzyl chloride |
| methoxymethyl | perdeuterio-methoxymethyl chloride |
| benzyloxymethyl | perdeuterio-benzyloxymethyl chloride. |

The novel perdeuterio intermediates are useful for preparing the deuterated reagents and samples which are used in the methods disclosed herein. These intermediates can be prepared by procedures which are selected from standard techniques of organic chemistry, techniques which are analogous to the synthesis of known structurally similar compounds, including the structurally similar corresponding non-deuterated compounds, and techniques which are analogous to the procedures described herein. The novel perdeuterio intermediates described herein and the procedures for their preparation are additional aspects of the invention. A prefered sub-set of perdeuterio intermediates includes the novel compounds selected from perdeuteriomethoxymethyl chloride, perdeuteriobenzyloxymethyl chloride, perdeuterio (tert-butoxy)methyl chloride, perdeuterio-2-methoxyethoxymethyl chloride, perdeuteriodihydropyran, perdeuterioisobutylene, perdeuterio-4-methoxyphenol, perdeuteriobenzyl chloride, perdeuterio-4-methoxybenzyl chloride, perdeuteriopivaloyl chloride, perdeuterio-9-fluorenylmethoxycarbonyl chloride, perdeuteriobenzyloxycarbonyl chloride, perdeuterio-9-hydroxymethylfluorene, perdeuterio-2,2,2-trichloroethanol, perdeuteriophenol, perdeuterio-9-fluorenylmethyl chloride, perdeuterio(tert-butoxy)carbonyl chloride, perdeuteriomethoxycarbonyl chloride, perdeuterio-9-fluorenylmethoxycarbonyl chloride, perdeuterio(tert-butyl)anhydride, perdeuteriobenzyl anhydride, perdeuterio-4-toluenesulfonyl chloride, perdeuteriophenylsulfonyl chloride, perdeuterio(tert-butoxy) carbonyl chloride, and perdeuterio-vinyl acetate.

The following deuterium containing compounds are commercially available, and may conveniently be used as starting materials for preparing the deuterium containing compounds and intermediates disclosed herein. This list is not limiting. The compounds are listed along with their corresponding Available Chemicals Database MFCD numbers.

| Starting Material | MFCD Number |
|---|---|
| $(CD_3)_2O$ | 00084137 |
| $CH_3SCH_3$ | 00044687 |
| $HOCD_2CD_2OH$ | 00144289 |
| $(CD_3)_2C=CD_2$ | 00084159 |
| $CD_2CDCl$ | 00145526 |
| $C_7D_7Cl$ | 00000891 |
| $d_7$-BnOH | 00084125 |
| $4\text{-}DOC_6D_4Cl$ | 00190404 |
| $CD_3CD_2Cl$ | 00143956 |
| $(CD_3)_2CDCl$ | 00142901 |
| DCOOD | 00037353 |
| $(CD_3CO)_2O$ | 00051051 |
| $CD_3COCl$ | 00000721 |
| $CD_2CCO_2H$ | 00143952 |
| $HOCD_2CO_2D$ | 00209729 |
| $t\text{-}C_4D_5Br$ | 00190390 |
| $C_6D_5COCl$ | 00134309 |
| $C_6D_5CO_2H$ | 00002400 |
| $CD_3CDO$ | 00044230 |
| THF-$d_8$ | 00044238 |
| $d_4$ Phthalic anhydride | 00145119 |
| $CD_3SO_2Cl$ | 00144751 |
| $CD_3OD$ | 00044637 |
| $CD_2=O$ | 00144373 |
| DCl | 00044642 |
| $C_6D_5CD_2OH$ | 00084125 |
| $(CD_3)_3COD$ | 00064244 |
| $C_6D_6$ | 00003010 |
| Isoprene-$d_8$ | 00144519 |
| mesitylene-$d_{12}$ | 00075579 |
| $CD_3CO_2D$ | 00051051 |
| $CD_3I$ | 00001074 |
| $LiAlD_4$ | 00044245 |
| $CD_3Cl$ | 00084130 |
| $C_2D_5OD$ | 00051020 |
| $HOC_6D_4OH$ | 00144462 |
| fluorene-$d_{10}$ | 00144313 |
| $ClCD_2CD_2OH$ | 00142896 |
| $C_6D_5OH$ | 00002144 |

It will be appreciated that the amino acids, protected amino acids, and other compounds disclosed herein may contain one or more asymmetrically substituted carbon atoms and may be isolated in optically active, racemic and/or diastereomeric form. It is to be understood that the present invention encompasses any racemic, optically-active, diastereomeric, or stereoisomeric form, or mixture thereof, it being well known in the art how to prepare optically-active forms (for example, by resolution of the racemic form or by synthesis from optically-active starting materials). It may be preferred to use the amino acids, protected amino acids, or other compounds in a form which is characterized as containing, for example, at least 75%, 95%, 98% or 99% enantiomeric excess.

Although the present invention can be successfully practiced using traditional infrared sample preparation and data collection techniques, these traditional techniques may not produce optimum results for compounds that are bound to a solid phase support, since the support material may cause a non-homogeneous distribution of compound in traditional macro infrared samples such as KBr disks, nujol mulls, and fluorolube preparations. Solid phase supports may also possess indexes of refraction differing from bulk sample, which may cause scattering of infrared beams resulting in distorted peaks and sloping baselines. Traditional application of attenuated total reflectance (ATR), diffuse reflectance (DRIFTS) and photoacoustic (PAS) spectroscopy are also often of limited utility for solid phase samples.

It has also been discovered that high quality infrared spectra can be obtained for compounds bound to solid phase supports using infrared microscopy and a single solid phase bead supported in KBr or in a diamond anvil infrared cell. Use of the infrared microscope allows the analysis to be performed on a small portion of the bead. This allows the pathlength of the bead throughout the infrared cross section to be effectively constant, which reduces scatter and improves linearity. The use of an infrared microscope to analyze solid-phase bound reaction samples which is disclosed herein, and which was discovered prior to the publication of: Yan B., *Journal of Organic Chemistry*, 1995, 60, 5736–5738, represents an improvement over previously known methods for analyzing solid-phase bound samples. Accordingly, the invention may preferably be carried out by measuring the infrared spectrum using an infrared microscope.

A variety of techniques for preparing infrared samples are well known in the art. Certain of these techniques, however, can be modified to allow superior quality spectra to be obtained for compounds that are bound to a solid phase support. For example, short pathlength spectra are required for strongly absorbing functional groups. These short path length spectra can preferably be obtained using an infrared microscope in conjunction with a diamond anvil compression cell. Longer pathlength spectra are required for weakly absorbing functional groups or for functional groups that are present in low concentration. These longer pathlength spectra can preferably be obtained from a single bead imbedded in a KBr disk. The KBr disk not only functions as a support substrate for transmission analysis of the bead, but, by matching the index of refraction of the bead to the parallel surfaces of the disk, the disk also reduces spectral artifacts and lensing of the bead. These sample preparation techniques facilitate the analysis of solid-phase bound samples using an infrared microscope, and they represent improvements over previously known solid-phase bound sample preparation methods. Accordingly, the above method may preferably be carried out using a sample comprising a solid phase bead mounted in a diamond anvil cell, or using a KBr disk prepared from a solid phase bead and KBr.

The invention may preferably be carried out using a polystyrene divinylbenzene solid phase support, in the form of a film, a pin, or in the form of a spherical bead with a diameter in the range of 10 to 800 µm. More preferably, the invention may be carried out using a polystyrene divinylbenzene solid phase support in the form of a spherical bead with a diameter in the range of 10 to 800 µm.

The invention may also preferably be carried out using a deuterated reagent containing a deuterated aryl or deuterated alkyl group, and more preferably using a deuterated reagent containing a perdeuteriophenyl, perdeuteriomethyl, perdeuterioethyl, or a perdeuterio-tert-butyl group.

Both aromatic and aliphatic C-D bonds exhibit characteristic stretching absorbances in the range of 2200–2400 wavenumbers. Aromatic C-D bonds also exhibit a characteristic absorbance in the range of 400–600 wavenumbers. The absorbance regions at 2200–2400 and 400–600 wavenumbers are useful for determining the presence of deuterium, because these regions are typically free from overlapping absorbances indicative of other common organic functional groups. As a result, the invention may also preferably be carried out by determining if deuterium has been incorporated, by determining the presence or absence of carbon-deuterium absorbances in the infrared spectra at 2200–2400 wavenumbers or, for compounds containing aromatic C-D bonds, by determining the presence or absence of carbon-deuterium absorbances in the infrared spectra at 400–600 wavenumbers.

In this specification the generic term "(1–6C)alkyl" includes both straight and branched chain alkyl radicals but references to individual alkyl radicals such as "propyl" embrace only the straight chain ("normal") radical, branched chain isomers such as "isopropyl" being referred to specifically. A particular value for (1–6C)alkyl is methyl, ethyl, propyl, isopropyl, butyl, isobutyl, tert-butyl, pentyl, isopentyl, hexyl or isohexyl. A more particular value for (1–6C)alkyl is methyl, ethyl, propyl, isopropyl, butyl, isobutyl or tert-butyl.

The invention will now be illustrated by the following non-limiting Examples in which, unless stated otherwise:

(i) Infrared spectra were collected using the NicPlan infrared microscope attached to a Nicolet 750 infrared spectrometer (Nicolet Instruments, Madison Wis. 53711, USA)

(ii) Data collection, absorbance calculations, derivative and smoothing calculations were performed using the standard Nicolet Instrument software package (OMNIC, Nicolet Instruments, Madison Wis. 53711, USA). Calibration regression calculations were performed using Nicolet Instruments quantitation software package (QUANT IR, Nicolet Instruments, Madison Wis. 53711, USA).

(iii) IR samples were prepared by dispersing (without grinding) several beads into KBr powder which was then pressed into a KBr disk using traditional KBr techniques.

(iv) temperatures are given in degrees Celsius (°C.); operations were carried out at room or ambient temperature, that is, at a temperature in the range of 18–25 ° C.;

(v) organic solutions were dried over anhydrous magnesium sulfate; evaporated, means evaporation of solvent under reduced pressure using a rotary evaporator;

(vi) chemical symbols have their usual meanings; SI units and symbols are used;

(vii) solvent ratios are given in volume:volume (v/v) terms;

(viii) If not commercially available, the necessary starting materials for the above procedures may be made by procedures which are selected from standard techniques of organic chemistry, techniques which are analogous to the synthesis of known, structurally similar compounds and techniques which are analogous to the above described procedures or the procedures described in the Examples.

(ix) Fmoc is defined to be fluorenylmethoxycarbonyl. Boc is defined to be tert-butoxycarbonyl. $^2$H is used interchangeably with deuterium (d).

(x) "P-" represents a polystyrenedivinylbenzene resin when used herein.

(xi) Standard three letter abbreviations are used to designate common amino acids

EXAMPLE 1

Determination of Reaction Success

Scheme 1 illustrates the reaction between perdeuteriobenzoyl chloride and an aminomethyl terminal polystyrenedivinylbenzene resin. This reaction was carried out as follows.

Figure 1:
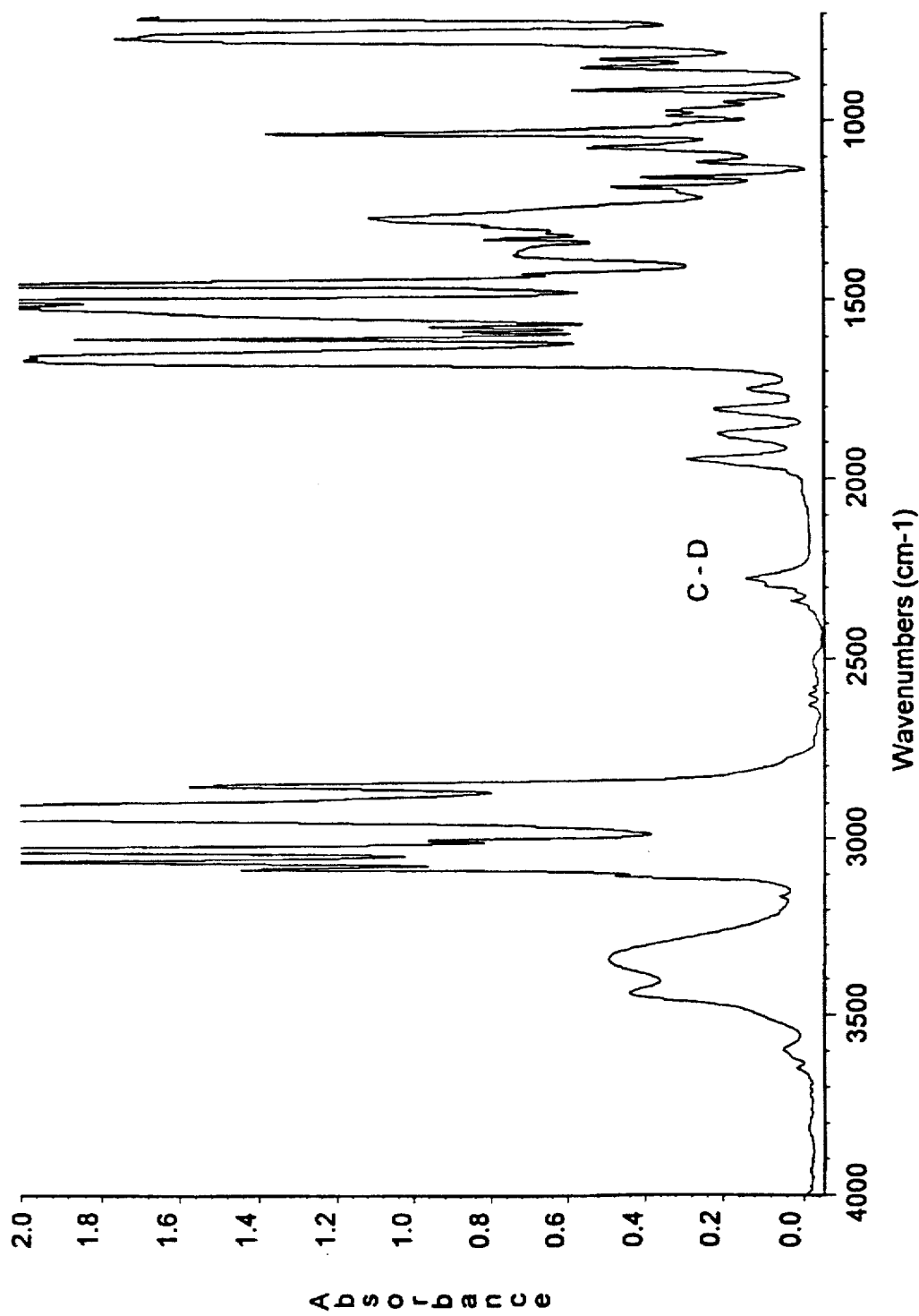
FIG. 1: Infrared spectrum for the product of Example 1.

To a slurry of the aminomethyl resin (0.60 mmol) preswelled in dichloromethane was added triethylamine (3.1 mmol), dimethylamineopyridine (catalytic amount), and perdeuteriobenzoyl chloride (3.1 mmol). The slurry was agitated (by bubbling nitrogen) for 2 hours at room temperature. The solution was drained from the resin and the resin was washed with dimethylforamide, dimethylforamide/dichloromethane (1:1), dichloromethane, dichloromethane/methanol (1:1), and methanol. The resin was dried at 40 ° C. for 18 hours at a pressure 0.0025 torr. IR samples were prepared by dispersing (without grinding) several beads into KBr powder which was then pressed into a KBr disk using traditional KBr techniques. FIG. 1 shows the infrared spectrum for the product, with the C-D stretch identified at 2200–2400 wavenumbers.

The presence of this absorbance signal in the infrared spectrum demonstrates that deuterium has been incorporated into the solid phase bound product.

EXAMPLE 2

Determining Yield of Benzylamide

Quantitative calibration standards were generated by performing a series of reactions in which an 4.6:1 molar excess of benzoyl chloride to amino-methyl resin was used.

For example, triethylamine (0.14 ml), dimethylaminopyridine (catalytic amount) and perdeuteriobenzoyl chloride (0.861 mmol, 4.6 equivalents) were added to a slurry of aminomethyl resin (150 mg, 0.188 mmol) preswelled in dichloromethane. The mixture was agitated with bubbling nitrogen at room temperature for 1 hour. The solution was drained from the resin and the resin was washed and dried as described in Example 1.

Figure 2:
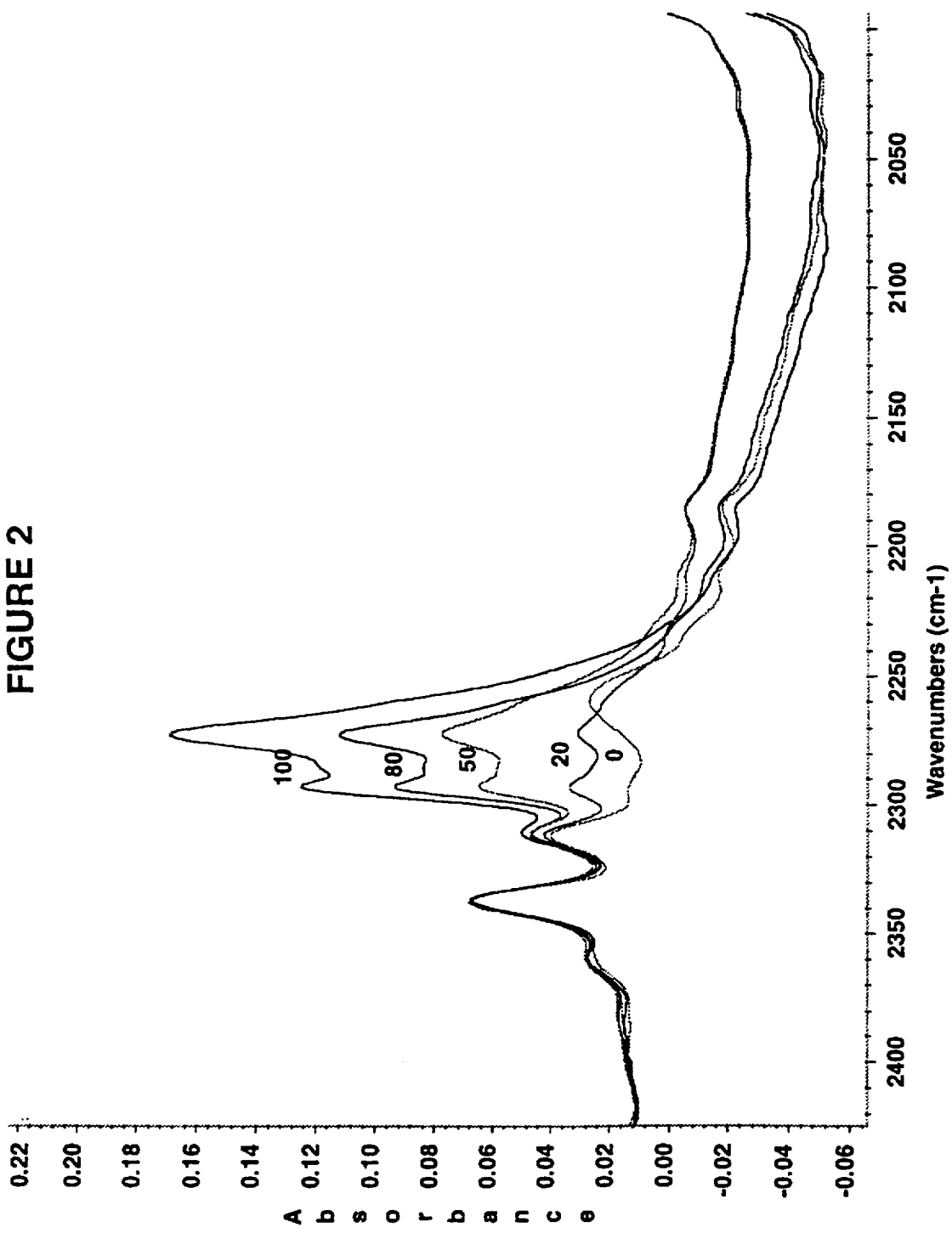
FIG. 2: Infrared C-D absorbance for the products of Example 2.
Figure 3:
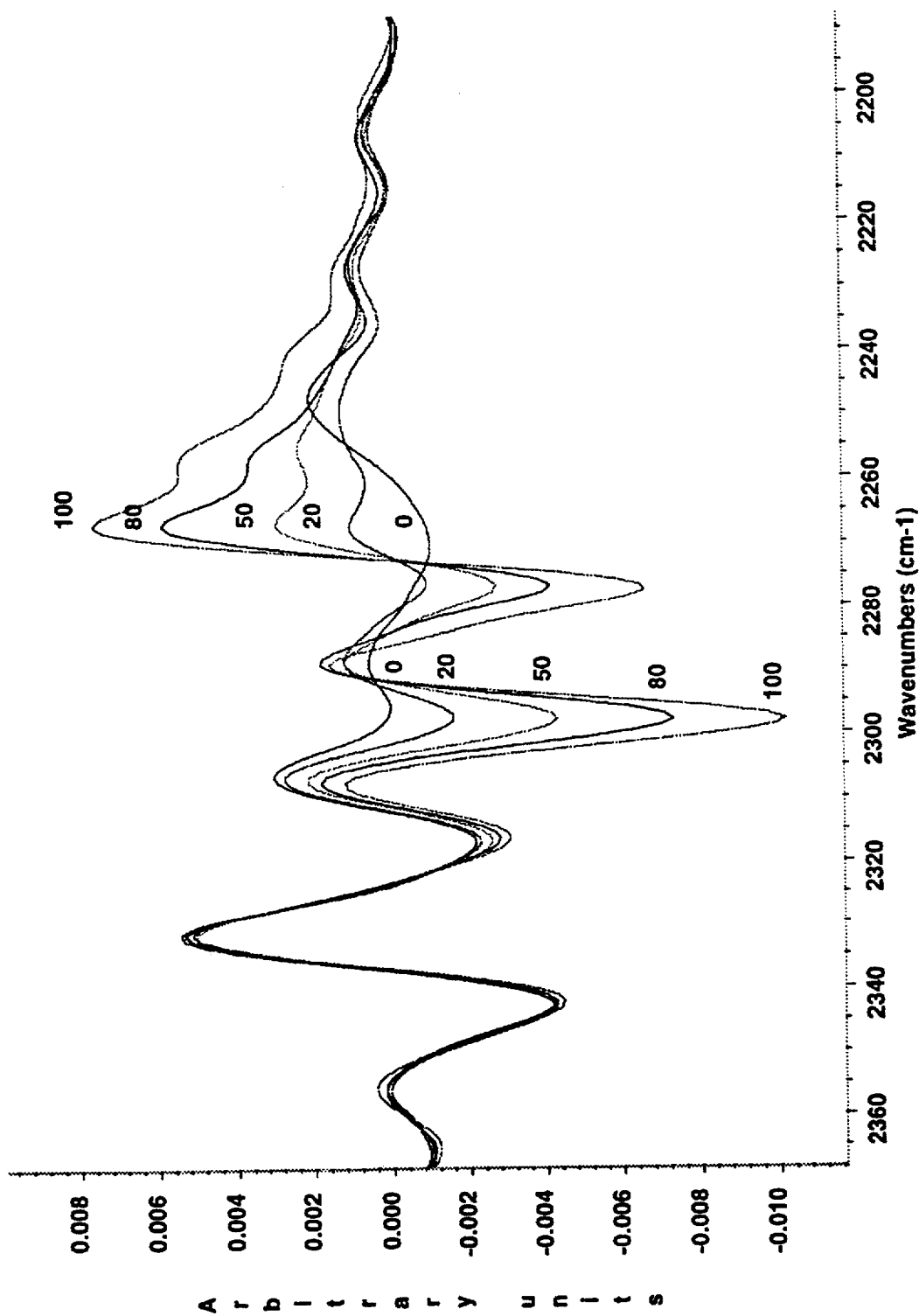
FIG. 3: First derivative plots of the infrared data from FIG. 2.

The above procedure was repeated four times, except replacing the perdeuteriobenzoyl chloride with mixtures of perdeuteriobenzoyl chloride and benzoyl chloride in the following ratios (80:20, 50:50, 20:80, and 0:100). FIG. 2 shows the C-D stretching absorbance data for the products of each of these reactions. Although the C-D absorbance is weak, the signal to noise generated in a 1 minute scan was adequate for quantitation. From FIG. 2, it is apparent that selection of baselines from which to calculate C-D absorbance values is not straight forward, especially for the 0% deuterium standard. First derivative spectra calculated for each standard, however, greatly simplify baseline selection as illustrated in FIG. 3. Using first derivative data, a simple calculation of derivative band height to zero was sufficient for linear calibration without reference to baseline, when the 2356.4–2342.9 cm-1 derivative absorbance was used as an internal pathlength reference upon which all analytical derivative bands were normalized. Calculated vs. actual data for the C-D stretch calibration regression are presented in Table 1.

TABLE 1

| Actual | Calculated |
| --- | --- |
| 100.0000 | 100.1459 |
| 80.0000 | 81.0521 |
| 50.0000 | 48.8319 |
| 20.0000 | 19.1451 |
| 0.0000 | 0.5434 |

The data in Table 1 shows good correlation between the actual values, which are based on the ratio of perdeuteriobenzoyl chloride to benzoyl chloride used in the preparation of the product, and the calculated values, determined from a linear regression calculation. The calibration data set generated from the above spectral data can be used to determine the yield for a similar benzyl-amide forming reaction. By comparing the absorbance data for a given reaction product, with this calibration data set, using Nicolet Instruments quantitation software package (QUANT IR, Nicolet Instruments, Madison Wis. 53711, USA), the yield for the reaction can be determined.

EXAMPLE 3

Determining Yield of Benzyl Ester

The effect of functional group modifications on the C-D stretch of benzylated materials was examined to determine the feasibility of using a universal calibration data set for all deuterium containing products.

Figure 4:
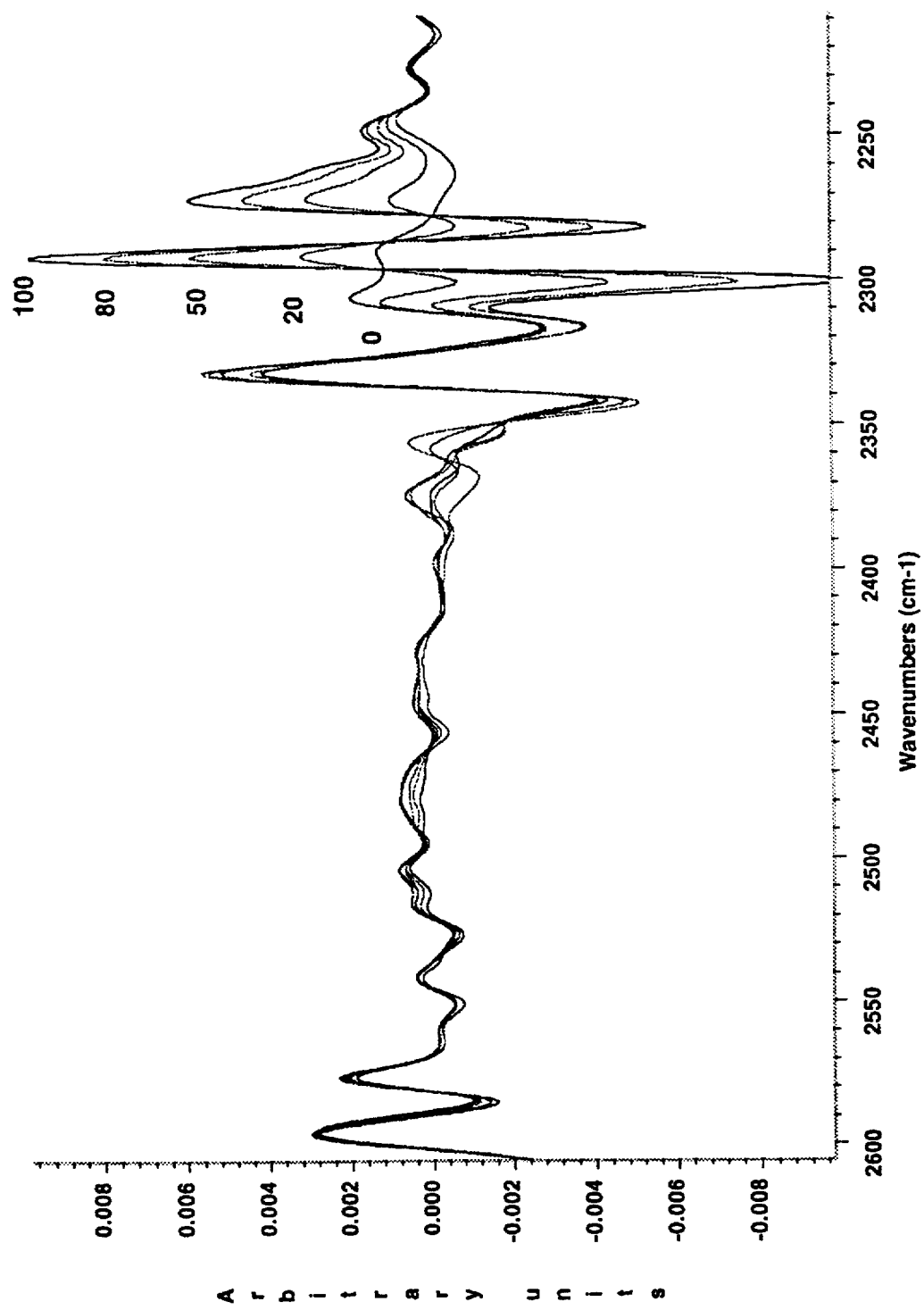
FIG. 4: First derivative plots of the C-D absorbances for the products of Example 3.

As shown in Scheme 2, triethylamine (0.055 ml), dimethylaminopyridine (catalytic amount) and perdeuteriobenzoyl chloride (0.04 ml, 6.38 equivalents) were added to a slurry of 4-hydroxymethylbenzamidemethyl resin (50 mg, 0.054 mmol) which had been preswelled in a minimum amount of dichloromethane. The mixture was agitated with bubbling nitrogen at room temperature for 18 hours. The reactants were drained from the resin and the resin was washed and dried at 40° C. for 5 hours at a pressure 0.0025 torr. An IR sample was prepared as described in Example 1. This procedure was repeated four times, except replacing the perdeuteriobenzoyl chloride with mixtures of perdeuteriobenzoyl chloride and benzoyl chloride in the following ratios (80:20, 50:50, 20:80, and 0:100). The infrared spectra for the benzylated products are shown in FIG. 4. Differences in the derivative band shape for the amide vs. ester coupling spectra clearly indicate inductive perturbation of the C-D absorbance. This suggests that the calibration data set generated from the benzyl amide products can not be used directly to determine yields for benzyl ester forming reactions. Therefore, a separate ester coupling calibration data set was generated. Calculated vs. actual data for the C-D stretch calibration regression of the benzyl ester products generated above are presented in Table 2.

TABLE 2

| Actual | Calculated |
| --- | --- |
| 100.0000 | 102.8687 |
| 80.0000 | 76.6503 |
| 50.0000 | 52.0723 |
| 20.0000 | 18.7118 |
| 0.0000 | 0.4952 |

The data in Table 2 shows good correlation between the actual values, which are based on the ratio of perdeuteriobenzoyl chloride to benzoyl chloride used in the preparation of each of the products, and the calculated values, determined from a linear regression calculation.

The calibration data set generated from the above spectral data can be used to determine the yield for a similar ester formation reaction. By comparing the absorbance data for a given reaction product, with this calibration data set, using Nicolet Instruments quantitation software package (QUANT IR, Nicolet Instruments, Madison Wis. 53711, USA), the yield for the reaction can be determined.

EXAMPLE 4

Determining Yield of $d_3$-Acetyl Reaction

Although deuterated aromatics offer advantages over aliphatics in peak width and resolution for infrared deuterium detection, calibration was also performed for a compound containing $d_3$-acetyl functionality.

Figure 5:
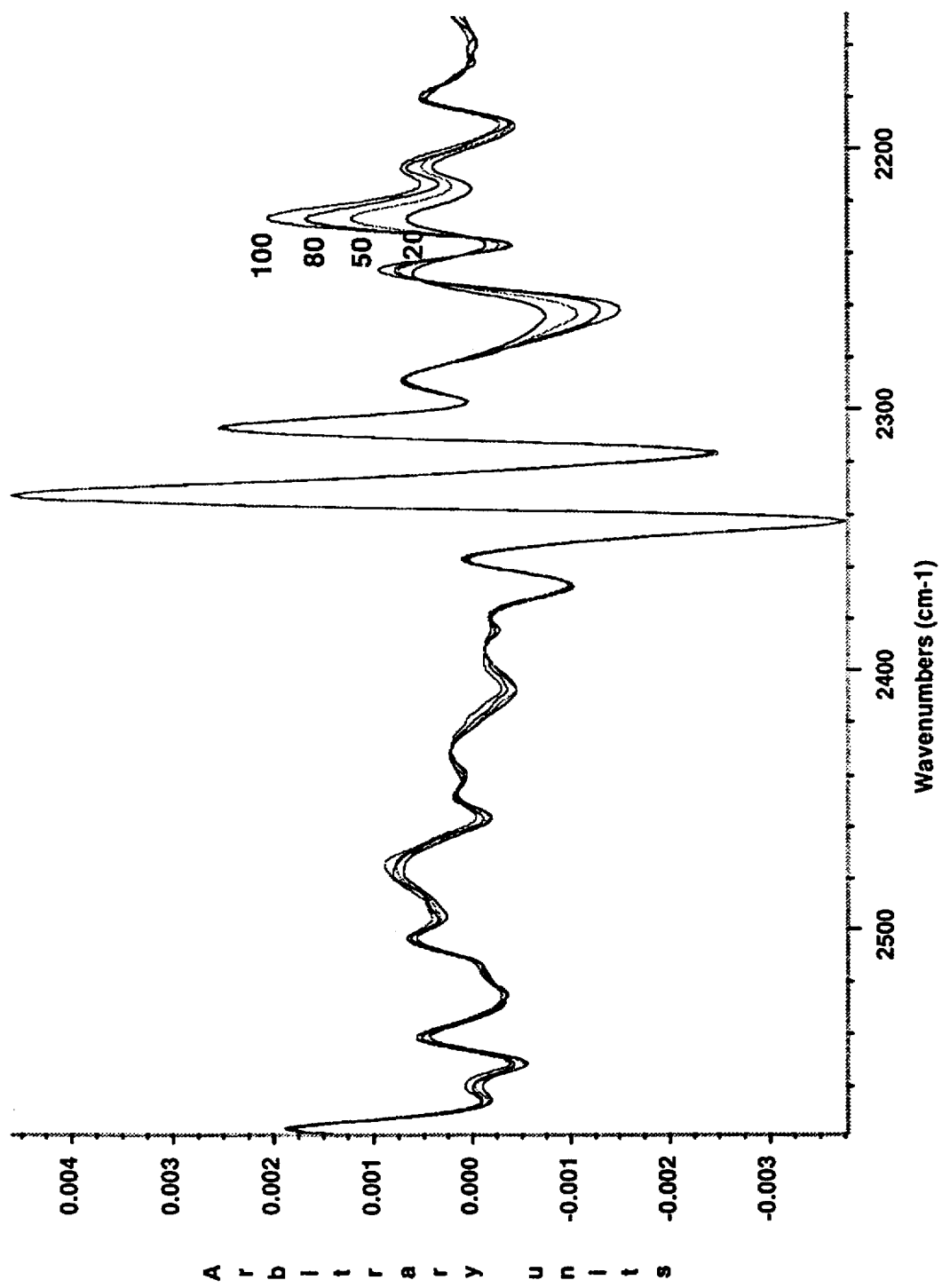
FIG. 5: First derivative plots of the C-D absorbances for the products of 5 Example 4.

As shown in Scheme 3, an excess of perdeuterioacetic anhydride in dimethylforamide (5% solution of acetic anhydride in dimethformamnide) was added to a slurry of aminomethyl resin (20 mg, 0.025 mmol) which had been preswelled with dimethylforamide. The reaction was agitated with bubbling nitrogen at room temperature for 18 hours. The solution was drained from the resin and the resin was washed and dried as described in Example 1. This procedure was repeated four times, except replacing the perdeuterioacetic anhydride with mixtures of perdeuterioacetic anhydride and acetic anhydride in the following ratios (80:20, 50:50, 20:80, and 0: 100). The first derivative infrared spectra for the products of these reactions are shown in FIG. 5. When compared to the spectra for the aromatic compounds illustrated in FIGS. 3 and 4, it can be seen that the $d_3$-acetyl spectrum is weaker and less well defined than that of the previously described aromatics, however, the regression data for the $d_3$-acetyl compounds was quantifiable. Calculated vs. actual data for the C-D stretch calibration regression are presented in Table 3.

TABLE 3

| Actual | Calculated |
| --- | --- |
| 100.0000 | 98.4535 |
| 80.0000 | 80.9671 |

TABLE 3-continued

| Actual | Calculated |
| --- | --- |
| 50.0000 | 51.1444 |
| 20.0000 | 19.3506 |
| 0.0000 | — |

The data in Table 3 shows good correlation between the actual values, which are based on the ratio of perdeuterio-acetic anhydride and acetic anhydride used in the preparation of each of the products, and the calculated values, determined from a linear regression calculation.

The calibration data set generated from the above spectral data can be used to determine the yield for a similar acylation reaction. By comparing the absorbance data for a given reaction product, with this calibration data set, using Nicolet Instruments quantitation software package (QUANT IR, Nicolet Instruments, Madison Wis. 53711, USA), the yield for the reaction can be determined.

EXAMPLE 5

Synthesis of α-[($^2$H$_9$)-tert-Butoxycarbonyloxy-imino]Benzyl Cyanide

To a solution of α-(hydroxyimino)benzyl cyanide (1.58 g, 10.8 mmol) and N, N-dimethylanaline (1.3 g) in dioxane (0.5 ml) and toluene (20 ml) at 0° C. was added a solution of triphosgene (1.07 g, 3.6 mmol). The resulting solution was stirred for 16 hours and cooled to 0° C. A mixture of ($^2$H$_{10}$)-tert-butanol (1 ml) and pyridine (1.1 ml) in toluene (5 ml) was added, the cooling bath was removed, and the mixture was stirred at 35° C. for 3 hours. The reaction was diluted with dichloromethane (100 ml), washed with water (20 ml), dried, and evaporated. Chromatography, with ethyl acetate:hexane (gradient 5:95–10:95) as the eluent gave material which was crystallized from methanol:water (1:9) to give the title compound (0.7 g) as pale yellow powder; mp 86.6° C.; NMR (CDCl$_3$, 300 Mhz): 7.46–7.60 (m,3), 7.93 –7.97 (m,2); $^{13}$C NMR (CDCl$_3$) 26.53 (septet), 85.42, 108.34, 127.32, 127.73, 129.15, 132.82, 137.45, 149.97. Analysis for C$_{13}$H$_5$D$_9$N$_2$O$_3$: C, 61.15; H, 5.52; N, 11.00; Found: C, 60.84; H, 5.68; N, 10.89.

EXAMPLE 6

Synthesis of α-N-(fluorenylmethoxycarbonyl)-ε-N-[($^2$H$_9$)-tert-butoxy-carbonyl]-L-lysine α[($^2$H$_9$)-tert-Butoxycarbonyloxyimino]benzyl cyanide (0.3 g, 1.17 mmol) was added to a mixture of a-N-(fluorenylmethoxycarbonyl)-L-lysine (0.57 g, 1.4 mmol) and triethylamine (0.8 ml) in water (10 ml) and dioxane (10 ml). After 3 hours, the mixture was diluted with water (100 ml) and extracted with ether and ethyl acetate. The aqueous phase was acidified with 1N hydrochloric acid and extracted with dichloromethane. The organic extracts were combined, dried and evaporated. Chromatography, with methanol:chloroform (gradient 2:98–10:90) gave the title compound (0.45 g) as white powder; mp 65–67° C.; NMR (CDCl$_3$, 300 Mhz): 1.3–1.96 (m,6), 2.93–3.18 (m,2), 4.13–4.81 (m,5), 5.73–5.92 and 6.16–6.40 (m,1), 7.19–7.79 (m,8), 7.79–8.50 (broad s,1); MS: m/z=469(M+1). Analysis for C$_{26}$H$_{23}$D$_9$N$_2$O$_6$0.5 H$_2$O: Calculated: C, 64.10; H, 6.83; N, 5.57; Found: C, 63.94; H, 6.60; N, 5.77.

EXAMPLE 7

Standard Procedure for coupling Amino Acid to Aminomethyl Polystyrene Resin

Aminomethyl resin was placed in a bond elute tube and washed with N,N-dimethylformamide. A minimum amount of N,N-dimethylformamide was added so that bubbling N$_2$ gas caused the mixture to mix efficiently. Fmoc-Gly-OH (3 eq), 1-hydroxybenzotriazole hydrate (HOBt) (5 eq) and 1,3-diisopropylcarbodiimide (DIC) (3.5 eq) were added. N$_2$ bubbling was continued for 2 hours. The resin was filtered and washed with N,N-dimethylformamide. A small sample was removed for testing by the Kaiser test. If the test was positive the coupling was repeated.

EXAMPLE 8

Standard Procedure for Removal of Fmoc Group

The resin was washed with N,N-dimethylformamide. A 20% solution of piperidine in N,N-dimethylformamide was added with N$_2$ bubbling for 5 minutes. The resin was filtered and washed with N,N-dimethylformamide. The deprotection was repeated for 10 minutes and then the resin was rewashed with N,N-dimethylformamide. A sample was removed and tested to ensure a positive Kaiser test.

EXAMPLE 9

Standard Procedure for Infrared Sampling

The resin was washed with dichloromethane and dried by pulling air through the resin for 10–15 minutes. Sample beads were imbedded in KBr and pressed into a pellet for analysis by direct transmission infrared microscopy. In each case, the infrared beam was apertured to a single bead in the KBr pellet. Collection Parameters were as follows:

| Spectrometer: | Magna System 750 | Resolution: | 4.0 from 650 to 4000 cm$^{-1}$ |
| --- | --- | --- | --- |
| Detector: | MCT/A | | |
| Beamsplitter: | Kbr | Levels of zero filling: | 1 |
| Number of scans: | 100 | | |
| Collect Sample Format: | Absorbance First | Apodization: Collection length: | Happ-Genzel 54.3 sec |
| Derivative Automatic Smooth | | | |

EXAMPLE 10

Synthesis of P-Gly-Gly-Gly

Aminomethyl styrene resin was prepared from chloromethyl styrene resin (Polumer Laboratories, PL-CMS Resin, 1.0 meq/g) using the procedure of Weinshenker. Weinshenker, N. M.; Shen, C. M.; Wong, J. Y., Organic Synthesis, vol. 56, pp. 95–99. The aminomethyl resin was coupled with N-(Fmoc)glycine using a procedure similar to that described in Example 7. The Fmoc group was removed using a procedure similar to that described in Example 8. This sequence was repeated three times to give the title compound, which has three glycine residues attached to the polystyrene resin.

EXAMPLE 11

Quantitative Infrared Analysis for ($^2$H$_9$)-Boc

The P-Gly-Gly-Gly material from Example 10 was divided into three portions and each was coupled with Fmoc-Lys-($^2$H$_9$)-Boc)—OH to give three groups of Fmoc protected terminal amines. A portion of each of the three protected amine samples was set aside. The Fmoc protecting group was removed using the standard procedure given above, to afford three samples of free amines. The three protected amine samples and the three deprotected amine samples were used to determine whether infrared absorbance measurements could be used to reliably measure the number of ($^2H_9$)-Boc groups incorporated on the resin. As discussed above in Example 2, large baseline variability made quantitative baseline selection very subjective for the raw absorbance data. Calculation of first derivatives, however, greatly facilitated quantitation and eliminated the need for baseline selection/correction. Savitsky-Golay smoothing was applied to each derivative spectrum prior to quantitation. Using smoothed first derivative data, calculation of derivative band height to zero at 2222.4 cm$^{-1}$ without reference to baseline provided suitable quantitation. In each case, the 2608.1 derivative peak minimum was subtracted from the 2596.6 cm$^{-1}$ derivative peak maximum to provide an internal pathlength reference against which all analytical derivative bands were normalized. The procedure was required due to bead to bead diameter variations resulting in analytical pathlength variations. Calibration set data exhibited an average error of 1.5 %. This demonstrates that matrix effects imposed by the presence of Fmoc vs. NH$_2$ introduce no quantitative bias.

EXAMPLE 12

Determination of the Absorbance of the d9-Boc Group's Dependence on Chemical Environment Using standard coupling (Example 7) and deprotection (Example 8) procedures, aminomethyl resin (A) was sequentially coupled with N-(fluorenylmethoxycarbonyl)-5-aminovaleric acid, Fmoc-Ala-OH, and Fmoc-Glu(OButyl)—OH as shown in Scheme 4. Samples were removed after each deprotection step to give B, C and D, respectively. All four primary amines (A–D) were subsequently coupled with Fmoc-Lys-(Boc-d$_9$)—OH (to give Fmoc-protected samples E–H. Samples E–H were subjected to standard deprotection conditions (Example 8) to give samples I–L. Infrared analysis of Samples A–L showed the C-D stretching absorbance of the d$_9$-Boc group to be very strong as compared to the absorbances for the coupling products of d$_5$-benzoyl chloride and d$_6$-acetic anhydride from Examples 2–4. The intensity of the absorbance for the d$_9$-Boc group suggests that it should be possible to analyze for this group using attenuated total reflectance (ATR) techniques, so that linear, pathlength independent spectra can be obtained.

As with data sets from earlier Examples, the calculation of first derivative spectra virtually eliminated the effects of sloping baseline on the calculation of absorbance intensities for samples A–L. Calculation of derivative band height to zero at 2234 cm$^{-1}$, without reference to baseline provided suitable quantitation. In each case, the 1861.7 cm$^{31\ 1}$ derivative absorbance corresponding to a polystyrene overtone, was used as an internal pathlength standard against which all derivative bands were normalized. Table 4 presents calculated vs. actual data for the C-D regression for samples A–L.

TABLE 4

| Sample | Actual | Calculated |
|---|---|---|
| A | 0.0000 | 0.0072 |
| B | 0.0000 | 0.0025 |
| C | 0.0000 | 0.0025 |
| D | 0.0000 | 0.0011 |
| E | 1.0000 | 1.0126 |
| F | 1.0000 | 0.9664 |
| G | 1.0000 | 1.0023 |
| H | 1.0000 | 1.0006 |

TABLE 4-continued

| Sample | Actual | Calculated |
|---|---|---|
| I | 1.0000 | 1.0302 |
| J | 1.0000 | 0.9661 |
| K | 1.0000 | 1.0062 |
| L | 1.0000 | 1.0059 |

With an average error of 1.16 %, the d$_9$-Boc absorbance measurements proved to be largely matrix independent and well suited to quantitation. The inert character of the d$_9$-Boc (C-D stretching) absorbance to its environment permits this protecting group to be used as a quantitative spectroscopic tool for the analysis of reaction efficiency.

EXAMPLE 13

Determination of Matrix Effects on C-D Absorbance for Compounds containing one ($^2H_9$)-Boc Group In order examine chemical environment matrix effects on the C-D absorbance, five samples (M, O, Q, S and T) each containing only one (2H$_9$)-Boc group were prepared from the product of Example 10, as shown in Scheme 5, using standard coupling (Example 7) and deprotection (Example 8) procedures. Sample M has ($^2H_9$)-Boc attached directly to a Gly-Gly-Gly spacer; samples O and Q contain an Fmoc protected and unprotected lysine which is separated by a lysine residue from the spacer; and samples S and T contain Fmoc protected and unprotected lysine separated from the spacer by a Lys-Glu dipeptide. The infrared spectra for the resin bound compounds M, O, Q, S, and T showed that different chemical environments had negligible effect on the ability to quantitate C-D absorbance of the ($^2H_9$)-Boc protecting group. As a result, a single universal calibration matrix can be used for the ($^2H_9$)-Boc protecting group.

EXAMPLE 14

Determination of C-D Absorbance Linearity for Compounds containing more than one ($^2H_9$)-Boc Group As a further test of the matrix independent C-D absorbance intensity, and as an extrapolation of absorbance linearity, the samples shown in Scheme 6, containing multiple ($^2H_9$)-Boc groups were prepared using the standard procedures described in Examples 7 and 8. Samples U and X contain two ($^2H_9$)-Boc groups, samples V and Y contain three ($^2H_9$)-Boc and samples W and Z contain four ($^2H_9$)-Boc groups. Infrared spectra were recorded for Samples U–Z and the spectra were quantified using the 0–1 ($^2H_9$)-Boc calibration generated in Example 11. Calculated vs. actual results are presented in Table 5.

TABLE 5

| Sample | Actual | Calculated |
|---|---|---|
| U | 2.00 | 1.98 |
| X | 2.00 | 2.03 |
| V | 3.00 | 2.92 |
| Y | 3.00 | 3.03 |
| W | 4.00 | 3.92 |
| Z | 4.00 | 4.00 |

The exceptional fit of the data for samples U–Z along with the results of Examples 11–13 demonstrate that infrared

17 analysis and the use of deuterium containing reagents can greatly facilitate the synthesis and characterization of support bound chemical compounds and libraries. The quantitative use of infrared spectroscopy demonstrated by the above Examples may be applied to an array of ligands, linkers and deuterium containing protecting groups.

EXAMPLE 15

Synthesis of P-Gly-Gly-Gly-NH-($^2$H$_9$)-Boc (M)

Compound 5 was placed in a bond elut tube and washed with N,N-dimethylformamide. A minimum amount of N,N-dimethylformamide was added along with a-[($^2$H$_9$)-tert-butoxycarbonyloxyimino]benzyl cyanide (2 equivalents) and triethylamine (2 equivalents). N$_2$ bubbling was continued for 8 hours and the resin was filtered and washed with N,N-dimethylformamide to give the title compound.

EXAMPLE 16

Synthesis of P-Gly-Gly-Gly-Lys(Boc)-NH$_2$ (N)

Prepared from the compound of EXAMPLE 10 by coupling with Fmoc-Lys(Boc)—OH, followed by Fmoc removal, using the standard procedures described above.

EXAMPLE 17

Synthesis of P-Gly-Gly-Gly-Lys(Boc)-Lys(Boc-d$_9$)-NHFmoc O

Prepared from N by coupling with 2 using the standard procedures described above.

EXAMPLE 18

Synthesis of P-Gly-Gly-Gly-Lys(Boc)-Lys(Boc-d$_9$)-NH$_2$ (Q)

Prepared from O by Fmoc removal using the standard procedures described above.

EXAMPLE 19

Synthesis of P-Gly-Gly-Gly-Lys(Boc)-Glu(OBu-t)-NH$_2$ (R)

Prepared from N by coupling with Fmoc-Glu(OBu-t)—OH followed by Fmoc removal using the standard procedures described above.

EXAMPLE 20

Synthesis of P-Gly-Gly-Gly-Lys(Boc)-Glu(OBu-t)-Lys(Boc-d$_9$)-NHFmoc (S)

Prepared from R by coupling with 2 using the standard procedures described above.

18

EXAMPLE 21

Synthesis of P-Gly-Gly-Gly-Lys(Boc)-Glu(OBu-t)-Lys(Boc-d$_9$)-NHFmoc (T)

Prepared from S by Fmoc removal using the standard procedures described above.

SCHEME 1

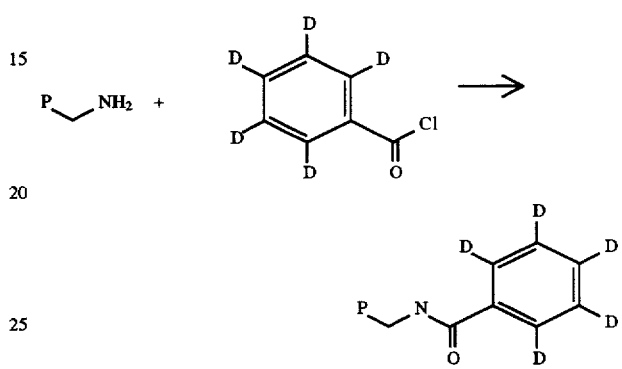

SCHEME 2

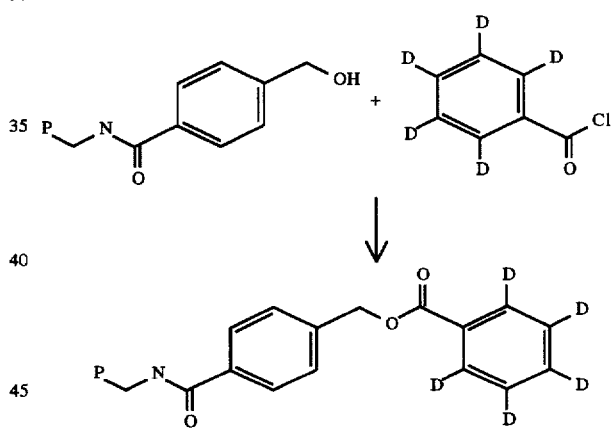

SCHEME 3

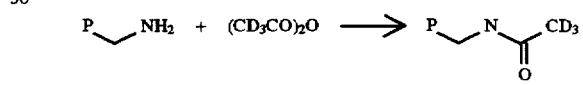

SCHEME 4

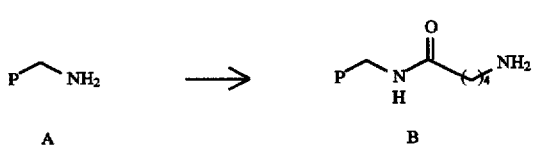

-continued
SCHEME 4
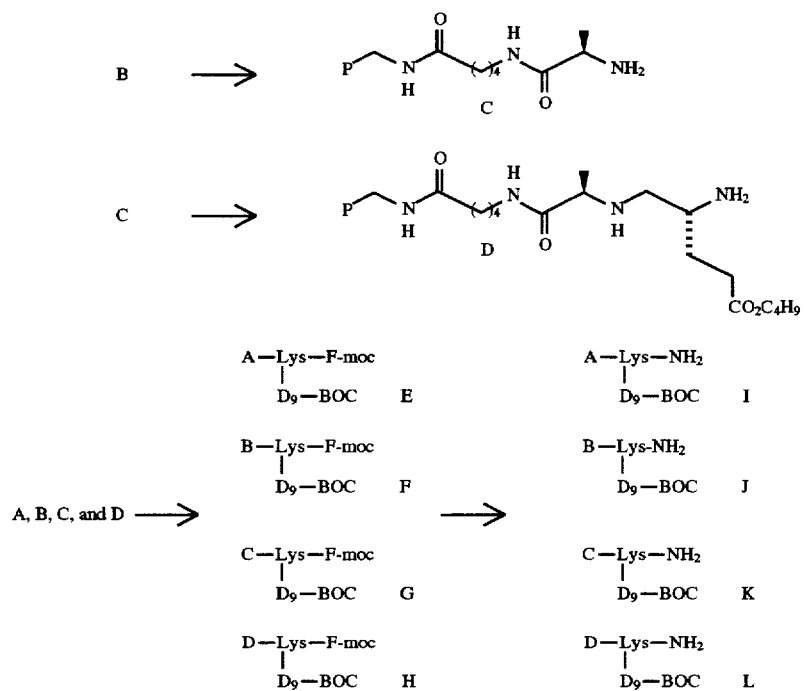
SCHEME 5
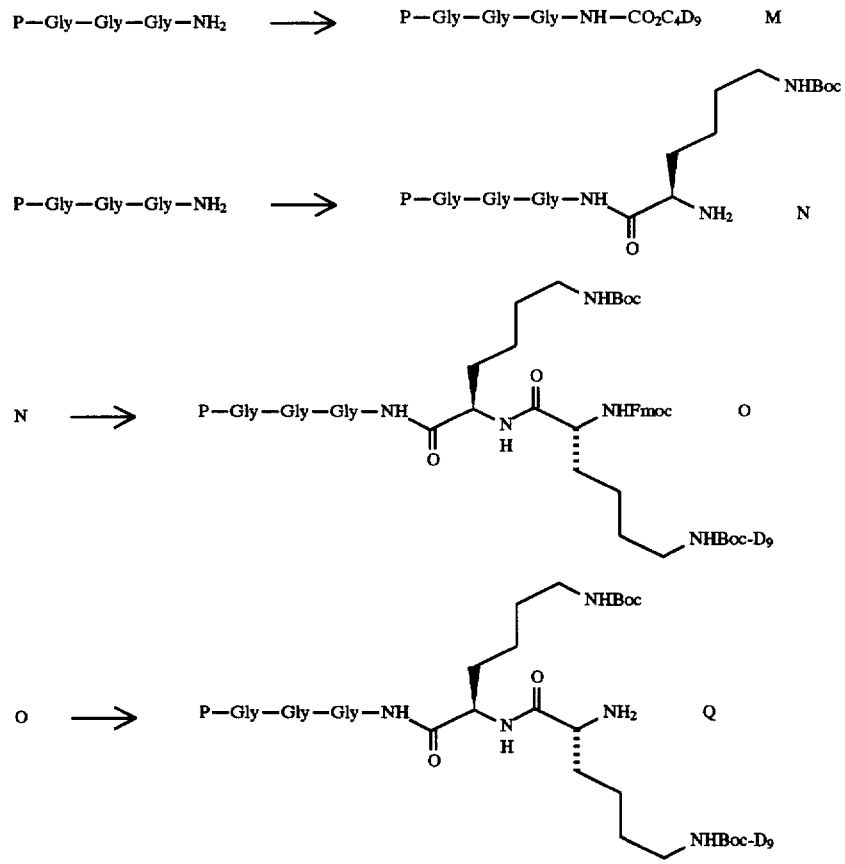

-continued
SCHEME 5
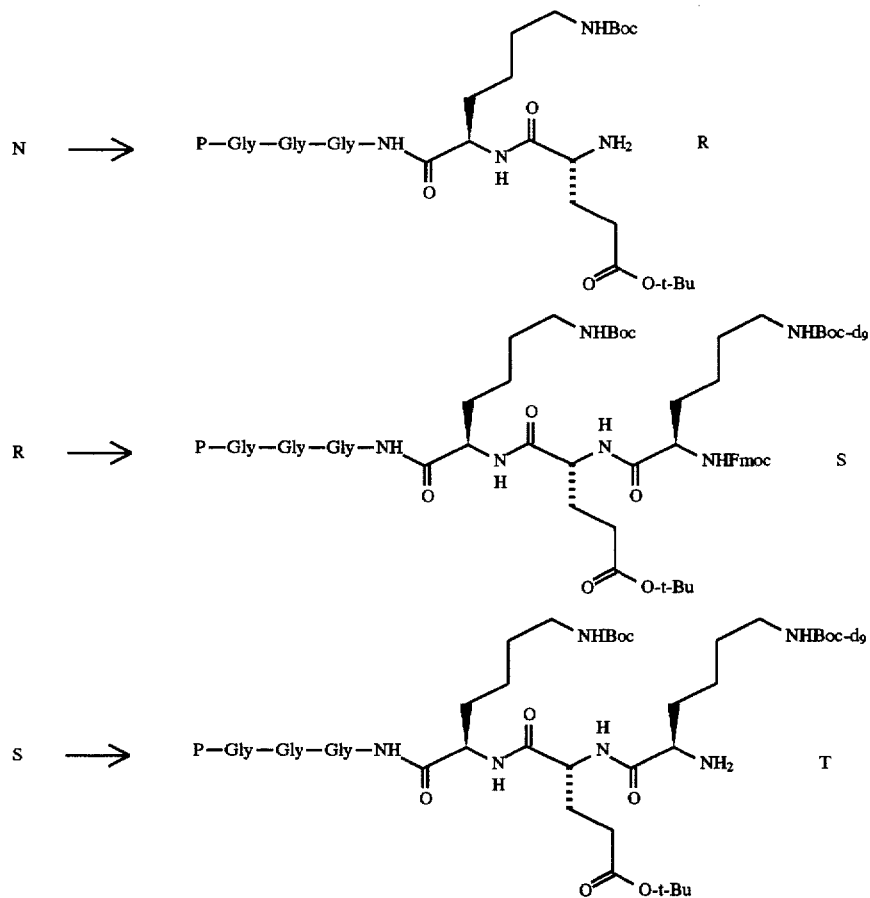
SCHEME 6
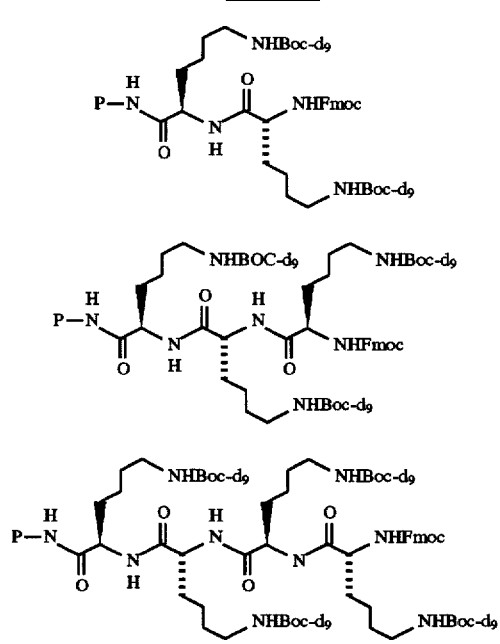
-continued
SCHEME 6
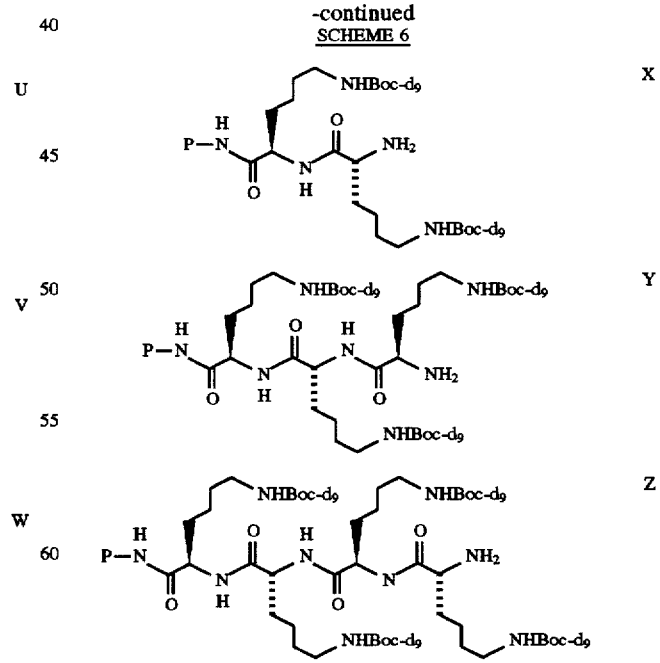
What is claimed is:
1. A method for determining the viability of a solid-phase reaction between a carbon-containing aromatic or aliphatic compound and a non-deuterated reagent comprising the steps of: a) reacting the compound which is bound to a solid-phase support with a deuterium containing reagent corresponding to the non-deuterated reagent; b) measuring the infrared spectrum of the resulting product; and c) determining if deuterium has been incorporated in said product by determining the presence or absence of carbon-deuterium absorbances in said infrared spectrum.

2. A method as claimed in claim 1 wherein the infrared spectrum is measured using an infrared microscope.

3. A method as claimed in claim 2 wherein the infrared sample is held in a diamond anvil cell.

4. A method as claimed in claim 2 wherein the infrared sample is in the form of a KBr disk.

5. A method for determining the yield of a solid-phase reaction between a carbon-containing aromatic or aliphatic compound and a deuterium containing reagent comprising the steps of: a) measuring the infrared spectrum of the solid-phase bound reaction product; b) comparing the spectral data to a calibration data set that correlates carbon-deuterium absorbance with the percent deuterium present; and c) determining the yield for the solid-phase reaction.

6. A method for determining the yield of a solid-phase reaction comprising the steps of: a) reacting a compound which is bound to polystyrene-divinylbenzene spherical beads, with a reagent containing a perdeuteriophenyl group or a perdeuteriomethyl group; b) preparing an infrared sample from one of said beads using a diamond anvil; c) measuring the infrared absorbance spectrum of the resulting product using an infrared microscope; d) comparing the spectral data to a calibration data set that correlates carbon-deuterium absorption with the percent deuterium present; and e) determining the yield for the solid-phase reaction performed in step a).

7. A method for determining the viability of a solid phase chemical reaction involving a non-deuterated reagent, comprising the steps of: a) reacting a compound which is bound to a solid-phase support, with a deuterium containing reagent that corresponds to said non-deuterated reagent; b) measuring the infrared spectrum of the resulting product; c) determining if deuterium has been incorporated in said product by determining the presence or absence of carbon-deuterium absorbances in said infrared spectrum, and d) determining the viability of a solid phase chemical reaction involving a corresponding non-deuterated reagent.

8. A method for determining the number of deuterium containing protecting groups in a solid-phase bound sample comprising the steps of: a) measuring the infrared spectrum of a solid-phase bound sample; b) determining the number of deuterium containing protecting groups by comparing the spectral data to a calibration data set that correlates carbon-deuterium absorbance with the number of deuterium containing protecting groups present.

* * * * *